(12) United States Patent
Tuscano et al.

(10) Patent No.: US 11,501,285 B2
(45) Date of Patent: Nov. 15, 2022

(54) REMOTE ACTIVATION OF HARDWARE SECURE ELEMENT/SECURE ENVIRONMENT

(71) Applicant: Verizon Patent and Licensing Inc., Arlington, VA (US)

(72) Inventors: Paul Sharad Tuscano, Columbia, MD (US); Saloni Pokharna-Jain, Atlanta, GA (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 2216 days.

(21) Appl. No.: 14/577,891

(22) Filed: Dec. 19, 2014

(65) Prior Publication Data

US 2016/0180331 A1    Jun. 23, 2016

(51) Int. Cl.
| | |
|---|---|
| *G06Q 20/36* | (2012.01) |
| *H04W 4/14* | (2009.01) |
| *H04W 12/06* | (2021.01) |
| *H04W 12/08* | (2021.01) |
| *H04L 9/40* | (2022.01) |
| *G06Q 20/40* | (2012.01) |
| *G06Q 20/32* | (2012.01) |
| *H04W 12/30* | (2021.01) |

(52) U.S. Cl.
CPC ......... *G06Q 20/36* (2013.01); *G06Q 20/3255* (2013.01); *G06Q 20/3672* (2013.01); *G06Q 20/3674* (2013.01); *G06Q 20/4012* (2013.01); *H04L 63/0853* (2013.01); *H04L 63/102* (2013.01); *H04L 63/123* (2013.01); *H04W 4/14* (2013.01); *H04W 12/06* (2013.01); *H04W 12/08* (2013.01); *H04W 12/35* (2021.01); *H04L 63/0876* (2013.01)

(58) Field of Classification Search
CPC .................................................... G06Q 20/36
See application file for complete search history.

(56) References Cited

U.S. PATENT DOCUMENTS

| | | | | |
|---|---|---|---|---|
| 8,918,855 B2* | 12/2014 | Singh | ...................... | G06F 21/35 726/9 |
| 2012/0255028 A1* | 10/2012 | Williams | .............. | G06F 21/602 726/26 |
| 2014/0324698 A1* | 10/2014 | Dolcino | ............. | G06Q 20/3227 705/44 |

* cited by examiner

*Primary Examiner* — John W Hayes
*Assistant Examiner* — Zehra Raza (57) ABSTRACT

A method is provided for managing an activation process of a secure element of a mobile station. The method includes detecting access by a computing device to an online service for managing an activation process of a secure element of a mobile station, receiving information confirming that a user of the computing device has permission to access the mobile station to confirm that the user of the computing device has permission to access the mobile station, triggering instantiation of a wallet application on the mobile station, the wallet application configured to access the secure element, triggering the wallet application to initiate activation and programming of the secure element, receiving a confirmation that activation and programming of the secure element are complete, and providing, to at least one of the computing device and the mobile station, a visual output representing that activation and programming of the secure element are complete.

21 Claims, 8 Drawing Sheets

REMOTE ACTIVATION OF HARDWARE SECURE ELEMENT/SECURE ENVIRONMENT

BACKGROUND

Unless otherwise indicated herein, the materials described in this section are not prior art to the claims in the present application and are not admitted to be prior art by inclusion in this section.

Initially, mobile phones were introduced as communication terminals to place and receive phone calls via a radio link. Not long ago, to handle financial transactions mobile terminals, such as mobile phones and personal digital assistants, were provisioned with financial and payment capabilities, such as electronic wallets, credit cards, debit cards, and/or transit cards. For a secure handling of financial and payment activities, these kinds of cards were provided in secure elements (SEs), which are components of the mobile terminals. As known, a secure element is interacted with using procedures established to promote security of information stored in the secure element, such as personal financial information.

Currently, in order to make a financial transaction, such as a payment, using a mobile station, a consumer is required to have the mobile station in hand and must execute an application that has access to the secure element, and the financial information (e.g., account information) stored therein, to begin the set up process of activating the secure element for processing the financial transaction. For example, a consumer shopping at a brick-and-mortar drugstore may open an application and scan (e.g., using near field communication or short-range radio technology) his/her mobile station at a reader in the drugstore in order to pay for goods the consumer is purchasing at the drugstore. The application may communicate the payment information (e.g., bank account number, credit card number, or authorization to add a charge to a monthly telephone bill) stored in the secure element to the reader in the drugstore. However, because the secure element is activated through a physical process that requires physical proximity to the reader, the secure element is not configured to enable secure handling of online financial and payment activities with a service requiring online access to the secure element. For example, a consumer ordering a book at an online bookstore may not be able to rely on the secure element using the techniques described above.

Hence, a need exits for a method and system that enable an online activation of a hardware secure element for secure handling of online financial and payment activities.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF THE DRAWINGS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a remote activation and initiation of a secure element integral to a mobile station. The activation flow of the secure element is performed from a remote computing station accessing the Internet.

As stated above, currently a consumer is required to have a computing station in hand and must download and activate an application that has access to the secure element (SE) to begin the set up process for a financial transaction, such as a payment to an electronic reader at a brick-and-mortar store. However, because the secure element is not activated through an online process, and is instead activated by a physical process which may require proximity to a reader, the secure element is not configured to enable secure handling of online financial and payment activities with a service requiring online access (rather than physical access) to the secure element.

Accordingly, a system and method are provided to initiate configuration and activation of a secure hardware of a computing station, such as a secure element or a station trust zone, from a remote service (not resident on the computing station with the secure element). As known, a station trust zone is a hardware component of a station that provides a root of trust such that applications running on the station are executed in a controlled and trusted environment. For example to initiate the activation and configuration of the secure element remotely over the Internet, a preloaded client on the computing station, such as a wallet application, with access to the secure element is used to check a status of the secure element and to inform the user whether the set-up of the secure element has been completed.

In accordance with the present disclosure, a secure element is a micro-controller that may be provided in the computing station in different forms, such as a smart card, a universal integrated circuit card (UICC), and a smart secure digital card. Alternatively, the secure element may be an embedded element, such as a chip directly bonded on the computing station mother board.

As known to one of ordinary skill in the art, similar to a computer, a secure element is configured to host one or more applications. Typical applications include network authentication applications stored in subscriber identity module (SIM) cards, payment applications associated with credit cards, and user authentication and signature applications.

In one exemplary implementation, for an activation of a secure element of a mobile station, a user accesses a website of a secure element activation server using a computing station, which provides an online service that uses an authentication process to connect with a wallet application of the mobile station. Upon connection with the wallet application of the mobile station, a wallet application server, which provides the online activation of the secure element, may determine an identifier of the SIM card (IMEI, manufacturer's identifier, etc.) and/or an identifier of the mobile station (e.g., mobile device number, IMEI, manufacturer identifier, etc.). The combination of the identifier of the SIM card and the identifier of the mobile station (or one of these alone) may correspond to financial account information (e.g., bank account information, credit card information, authorization to add a charge to a monthly telephone bill, etc.), which is stored in the secure element of the mobile station. This financial account information may be used for an online financial transaction.

In another implementation of the activation process, which may be distinct from the implementation described above, the user securely logs into a mobile network operator (MNO) site through the computing station. The user may be a customer or a subscriber of the MNO's network. For example, if the MNO is Verizon Wireless®, the user may be a customer or a subscriber who has a mobile station (e.g., a mobile phone) with a Verizon Wireless® mobile data plan. The secure log in may include entering a user identifier and a password. Upon the user's log in, the computing station may have access to stored information about the user, such as the user's mobile station number (MSN), mobile station type, UICC identification (ID) of the mobile station, a wallet client (such as a wallet application) available on the mobile station, and an email address.

Following the MNO secure login, the user accesses a wallet sign-up process. The wallet sign-up process is provided by a wallet server, which is part of a wallet managing system. The user enters a username and password to establish the wallet account for him/herself. In some cases, the user may confirm the password by repeating its entry, to ensure that the user did not incorrectly type the password the first time and that the user has remembered the password. Alternatively, if the user is a subscriber of the MNO who already has online account access credentials with the MNO, the user may use his/her existing MNO online account access credentials (e.g., login information to view account information and pay the monthly bill) to establish the wallet account. In this alternative implementation, the user may be prompted to establish an additional personal identification number (PIN) for the wallet application to reduce the likelihood of unauthorized access to the wallet application.

Subsequently, if the wallet application is not installed on the mobile station, the wallet server may notify the user (e.g., by a text display at a computing station the user is using to access the wallet server or at the mobile station) to install the wallet application. After the wallet application has been installed on the mobile station, the wallet server triggers a wake-up of the wallet application at the mobile station, using for example a wake-up short message service (SMS) message or a persistent data connection to the mobile station. The wallet application then checks a status of the secure element. This status checking involves determining whether the secure element is already part of the mobile station, and, if so, whether the secure element is already configured with at least one preexisting account, which permits the mobile station to engage financial transactions using the secure element. The wallet application may have appropriate permissions to access the secure element. In response to the status check, the secure element generates and sends a status response (representing whether the secure element is configured with financial information) to the wallet application, which forwards the status response to the wallet server.

In response, the wallet server provides terms and conditions (T&C) of a wallet service to be accepted by the user via the website, which is displayed on a display of the remote computing station. The terms and conditions (T&C) of the wallet service may include legal information regarding payments through the wallet application. Once the terms of service are accepted by the user, the activation and programming process is initiated from the wallet server. The wallet server then informs a trusted service manager (TSM), which is also part of the wallet managing network, about the initiation of the activation and programming process, so that the wallet server and the TSM begin programming the secure element. At this point, the process for remote activation of the secure element is triggered.

Once the secure element programming is complete, the wallet application has access to stored financial information (e.g., bank account information, credit card information, or authorization to add a charge to a monthly telephone bill) and is capable of remotely processing financial transactions, such as payments. At this time, the TSM sends a notice to the wallet server to prompt the website to display a notification that the set-up process is complete and to prompt the wallet application to display an alert on the mobile station that the set-up is complete. The wallet application may now be used for financial transaction(s) at computers remote from the mobile station that do not have direct access to the mobile station. For example, a user shopping at an online bookstore may indicate, to the online bookstore, an identifier of the mobile station (e.g., the MDN), and other secure information identifying the user (e.g., the username and password registered with the wallet server) to make the payment. The information to make the payment may be provided in place of other information that the user may provide to make the payment (e.g., a credit card number), and the payment may be processed using the financial information stored in the secure element of the mobile station.

Accordingly, the above-discussed procedure relates to remotely activating a secure element of a computing station. Reference now is made in detail to the examples illustrated in the accompanying drawings and discussed below.

Figure 1:
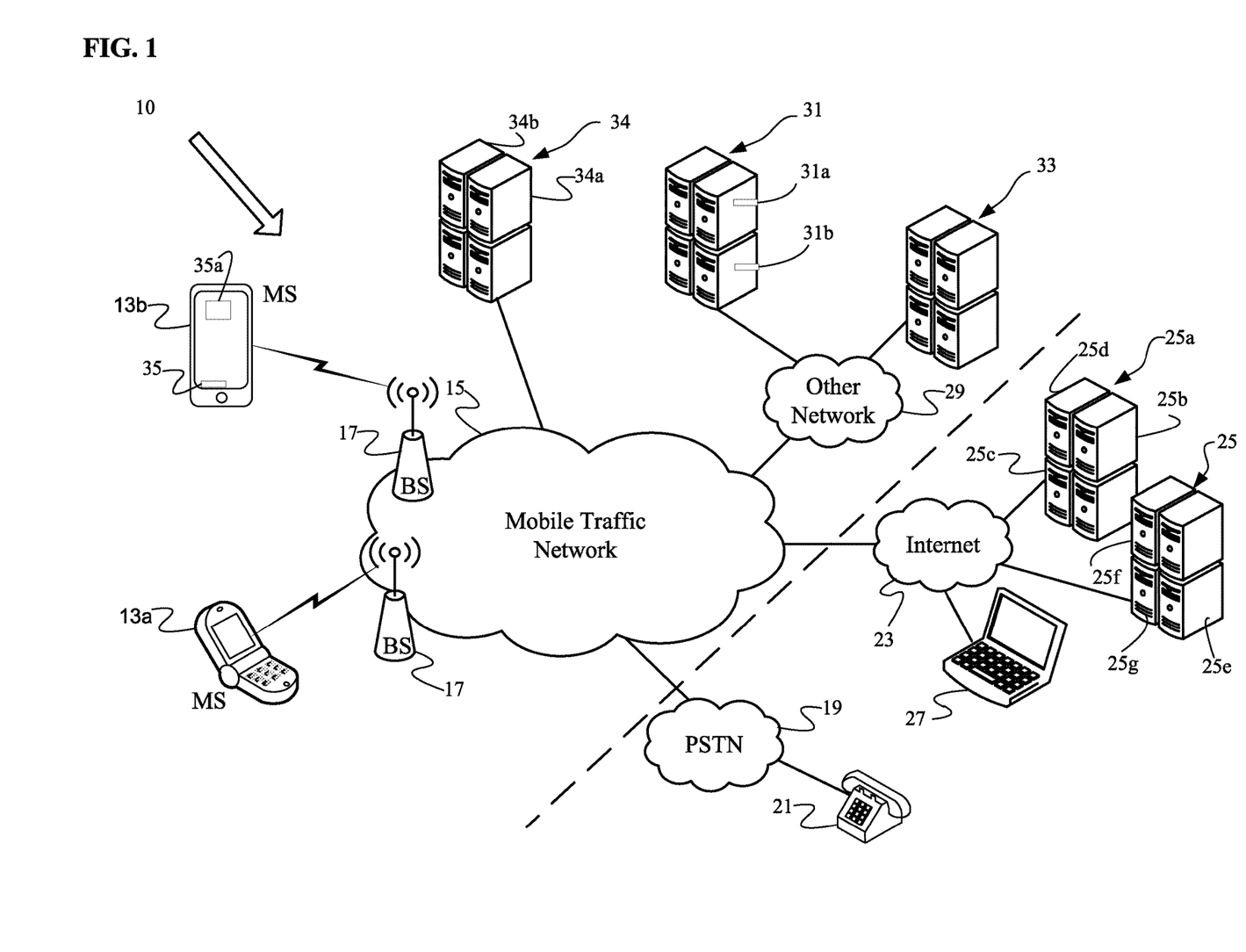
FIG. 1 illustrates a high-level functional block diagram of an exemplary system of networks/stations that provide various communications for mobile stations to support activation of secure elements of mobile stations.

FIG. 1 illustrates a system 10 offering a variety of mobile communication services to support remote activation of a secure element integral to a mobile station. The example shows simply two mobile stations (MSs) 13a and 13b as well as a mobile communication network 15. The mobile stations 13a and 13b are examples of mobile stations that include secure elements that enable them to handle online marketing and financial activities.

The network 15 provides mobile wireless communications services to stations 13a and 13b as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b may be capable of voice and data communications through the network 15.

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with server 25 as well as with a variety of other types of stations or systems capable of data communications through various interconnected networks.

Mobile stations 13a and 13b can take the form of portable handsets, smart-phones or personal digital assistants, although they may be implemented in other form factors. Program applications, including an application to assist in the remote activation of integral secure elements, can be configured to execute on many different types of mobile stations 13a and 13b. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of stations can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13a and 13b, can include one or more RANs and a regional circuit and/or packet switched network and associated signaling network facilities.

Physical elements of a RAN, operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations 13 communicate. The network 15 can also include other elements that support functionality other than station-to-station media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier also operates a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more wallet activation server 31, which provides the activation website 31a to be accessed by the user to activate the secure element 35a of his/her mobile station 13.

A mobile station 13a or 13b communicates over the air with a base station 17 and through the traffic network 15 for various voice and data communications, e.g. through the Internet 23 with a server 25 and/or with a wallet application server 34a, which is part of a wallet managing system 34. The wallet application server 34a may offer an application for handling financial transactions with a secure element of the mobile station 13a or 13b (hereafter referred to as a wallet application 35). Once downloaded to a mobile station 13a or 13b, the wallet application 35 may be configured to trigger the activation of the secure element 35a in response to a request to the wallet activation server 31, and, after the secure element has been activated, to receive and respond to a request from the wallet application server 34a to determine an identifier (e.g., manufacturer ID number, serial number, etc.) of the secure element for the purpose of processing financial transactions, such as payments, via financial information stored in the secure element. The wallet application 35 may also be used to check an activation status of the secure element either before or after the secure element has been activated. As stated above, the secure element may be a smart card, a universal integrated circuit card (UICC), and a smart secure digital card.

Moreover, the wallet application 35 is configured to receive information from the wallet server as to whether the wallet setup is completed, and to display an alert on the station confirming that the wallet setup was completed.

As stated above, the wallet application 35 may be downloaded to mobile station 13a or 13b from the wallet application server 34a. Alternatively, the wallet application 35 may be provided by a separate entity (alone or through agreements with the carrier). In this case, the wallet application 35 may be provided to the mobile device 13 for download from the trusted service managing server 34b. Later, when the execution of the wallet application 35 is requested, for example, to facilitate an online financial transaction, the wallet application 35 may be executed with assistance from the wallet management server 34b. In one implementation, the wallet application server 34a is configured to provide and execute the wallet application 35, and the trusted service managing server 34b is configured to activate and program the secure element 35a. Servers such as 25 and 33 may provide any of a variety of common application or service functions in support of or in addition to an application program running on the mobile station 13. However, for purposes of further discussion, we will focus on functions thereof in support of the wallet application 35.

To insure that the wallet application 35 offered by wallet application server 34a is available to only authorized stations/users, the provider of the wallet application 35 may also deploy an authentication server 33. The authentication server 33 may be a separate physical server, as shown, or authentication server 33 may be implemented as another program module running on the same hardware platform as the wallet activation server 31. When the wallet application server 34a receives an access request identifying a mobile station 13, the wallet application server 34a provides appropriate information to the authentication server 33 to allow authentication server 33 to authenticate the mobile station 13 for access to financial information stored at the mobile station 13 as outlined herein. As stated above, the access request identifying the mobile station 13 may come from a computing station different from the mobile station 13, and may include an identifier (e.g., a MDN) of the mobile station 13, along with other information (e.g., a username and a password) securely identifying the user as someone who is authorized to access the mobile station 13. Alternatively, the access request may come from the mobile station 13 itself. Upon successful authentication of the user as someone who is authorized to access the mobile station 13 or of the mobile station 13 itself (if the mobile station 13 is the source of the access request), the authentication server 33 informs the wallet application server 34a that the authentication was successful. The wallet application server 34a provides, to the mobile station 13, access to the wallet application 35 through the various communication elements (e.g. 29, 15 and 17) of the network 10.

In summary, the wallet application 35 executes on the mobile station 13. The secure element 35a of the mobile station 13 stores financial information, accessible via the wallet application 35, for participating in a financial transaction. In accordance with the present disclosure, the financial transaction may be an online financial transaction and may be initiated from the mobile station 13 or from another computer. If another computer is used, the user may provide an identifier of the mobile station 13, so that the payment may be processed via the wallet application 35 of the mobile station 13. The wallet application server 34a is configured to activate the secure element 35a once the activation process is triggered by the user via the wallet activation server 31, and the setup process of the secure element 35a is performed by the TSM 34b. Later, the wallet application server 34a participates in accessing the secure element 35a for facilitating an online financial transaction. Once activated, the secure element 35a provides the financial information, stored at the mobile station 13, to enable handling of online marketing and financial activities. The secure element 35a provides the financial information to the wallet application 35. According to one example, the wallet application 35 receives, from the wallet application server 34a, an identity of the online merchant requesting the payment and provides the financial information directly to the online merchant. Alternatively, the wallet application 35 may provide the financial information to the wallet application server 34a for forwarding to the online merchant.

The wallet application server 34 provides access to the wallet application 35 via the Internet. As a result, a remote computer, different from the mobile station 13 may access the financial information stored at the mobile station for the purpose of engaging in a financial transaction. The wallet activation server 31, when executing code stored therein, activates the wallet application 35 and causes the financial information, stored at the mobile station 13, to be accessible to the remote computer via the wallet application server 34 and the wallet application 35.

The wallet application 35 under consideration here may be delivered to touch screen type mobile stations. Alternatively or additionally, the wallet application 35 under consideration may be delivered to non-touch type mobile stations. Hence, our simple example shows the mobile station 13a as a non-touch type mobile station and the mobile station 13b as a touch screen type mobile station.

Figure 2:
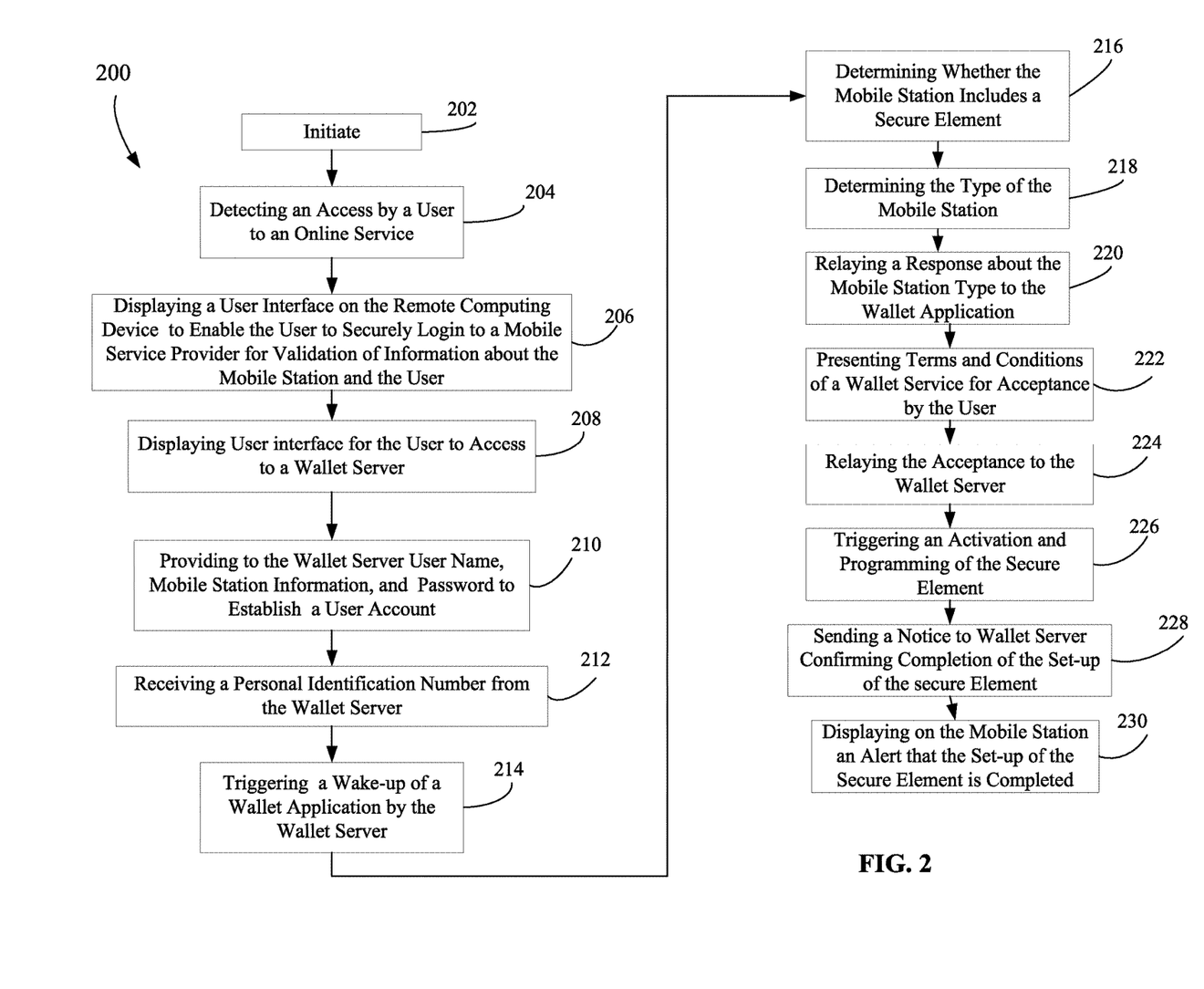
FIG. 2 illustrates an exemplary process for remotely activating a secure element integral to a mobile station from the web using a computing station distinct from the mobile station.

FIG. 2 illustrates an exemplary process 200 for remotely configuring and activating a secure element integral to a mobile station from the web using a computing station distinct from the mobile station. The process 200 may be initiated by a user who is seeking to activate the secure element by accessing via an online service a wallet service provided by a wallet managing system 34 through the web using a remote computing station, at Step 202.

The online service is provided by the wallet activation server 31, shown in FIG. 1, and is configured for managing the activation process 200. The wallet service is provided by a wallet management server 34b of the wallet management system 34. The wallet service provides wallet applications to be loaded on mobile stations, and activates and programs the secure elements of mobile stations to securely handle financial transactions, such as payments, via the mobile stations.

At Step 204, the process 200 detects, via a processor, an access by the user using the remote computing station, such as laptop PC type user terminal 27, to a web page of the activation supporting website 31a. Once the web page is accessed, an activation application 31b associated with the remote configuration and activation process 200 generates a user interface for display on the remote computing station 27. The user interface allows the user to securely login into an information technology (IT) site 25a, shown in FIG. 1, of a mobile service provider of the user's mobile station 13. For validation by the IT site 25a, the user provides via the user interface information about the mobile station number (MSN), the mobile station type, the identification of the secure element, the availability of the wallet application 35 on the mobile station 13a, and an email address of the user, at Step 206.

In one exemplary implementation, the validation is performed by checking for data stored about the mobile station and the user in a station management database 25d associated with IT site 25a. Upon receipt of validation of the information provided by the user from IT site 25a, the activation application 31b generates and displays another user interface. The new user interface enables the user to access, via a single-sign-on process for example, a wallet sign-up process to establish a user account to allow the user to activate his/her secure element, at Step 208. The wallet sign-up process is provided by the wallet application server 34a of the wallet management system 34.

At Step 210, the user enters into the user interface his/her username, his/her email ID, information about the mobile station, and a password, which are communicated to the wallet application server 34*a* in order to establish a user account. In response, the wallet sign-up process is configured to check a station whitelist. The station whitelist may have been created based on history of mobile stations that include hardware (e.g., a secure element capable of storing financial information) for handling online marketing and financial activities. The checking of the station whitelist is performed to confirm that the mobile station 13 deserves an activation of its secure element 35*a*. At step 212, the user receives a personal identification number (PIN) from the wallet server. The user may use the received PIN, in combination with an identifier of the mobile station 13, to access financial information stored in the mobile station 13 for participating in a financial transaction from a computer different from the mobile station 13. In one exemplary embodiment, the PIN may be provided to the user via an email or a short message service (SMS). Moreover, the wallet sign-up process may be configured to have the user choose his/her own PIN, which is provided by the user in a wallet interface provided in a website of a merchant to authenticate and authorize an online payment with the wallet application 35.

Alternatively, instead of entering his/her username and password, the user may enter his/her MNO credentials to establish his/her account. Once the account is established, the wallet application server 34*a* is configured to wake up the wallet application 35 via a wake-up SMS or via a signal communicated through a persistent data connection, at Step 214. The persistent data connection may include, for example, one or more of an Internet connection, a WiFi connection, or a cellular network (e.g., Global System for Mobile Communications, Code Divided Multiple Access, 3G, 4G, Long Term Evolution, etc.) connection that connects the mobile station 13 with the wallet application server 34*a*. The persistent data connection may be set up, for example, by verifying that both the wallet application server 34*a* and the mobile station 13 are connected to a network and creating an Internet Protocol (IP) channel between the wallet application server 34*a* and the mobile station 13 through the network. The persistent data connection may be created before executing Step 214.

In accordance with an exemplary implementation of the present disclosure, once awakened, the wallet application 35 is configured to check whether the mobile station 13 includes a secure element, at Step 216 (e.g., to confirm that the secure element has not been removed by the user, for instance, when transferring (e.g., selling) the mobile station to another user). Upon confirmation that the mobile station 13 includes the secure element, the wallet application 35 is configured to determine the type of the secure element 35*a* and to check whether the secure element 35*a* is already configured with a preexisting account, at Step 218. As above, the wallet application 35 has appropriate permissions/allowances to access a secure element 35*a* that is integral to the same mobile station 13. Once checked by the wallet application 35, the secure element 35*a* is configured to provide a response, which may include information about the preexisting account, to the wallet application 35, which forwards the response to the wallet application server 34*a*, at Step 220.

Upon receiving the response, the wallet application server 34*a* provides to the activation application 31*b* the terms and conditions (T&C) of a wallet service for acceptance by the user. The activation application 31*b* generates and displays a user interface to present the user the received terms and conditions (T&C) of a wallet service for his/her acceptance, at Step 222. Upon receipt of the acceptance from the user, the activation application 31*b* is configured to relay the acceptance to the wallet application server 34*a*, at Step 224. Upon receipt of the acceptance, the wallet application server 34*a* is configured to trigger an activation and programming process by informing the TSM 34*b* to begin programming the secure element 35*a*, after which the activation of the secure element 35*a* can be established, at Step 226, thereby establishing a digital wallet on the secure element 35*a* with payment credentials and a digital payment card. Moreover, once the digital wallet is established, a merchant is able to support online payments via the wallet application 35 and the secure element 35*a* of the mobile device 13.

When the programming of the secure element 35*a* is completed and the wallet activation is established, the TSM 34*b* is configured to generate and send a confirmation to the wallet application server 34*a* that the set-up of the secure element 35*a* is completed at Step 228. As such, a digital wallet is established in the secure element 35*a*. The confirmation may be any message transmitted over any protocol, for example, a SMS message or a confirmation message in the IP protocol. In response, the wallet application server 34*a* informs the wallet application 35 and the website 31*a* that the setup is complete, at Step 230. In response, the wallet application 35 may present information, at the mobile station 13, that the setup is complete. The displayed information may include text presented on the screen of the mobile station 13. The web site 31*a* may also display information, which may include text, that the setup is complete.

Figure 3:
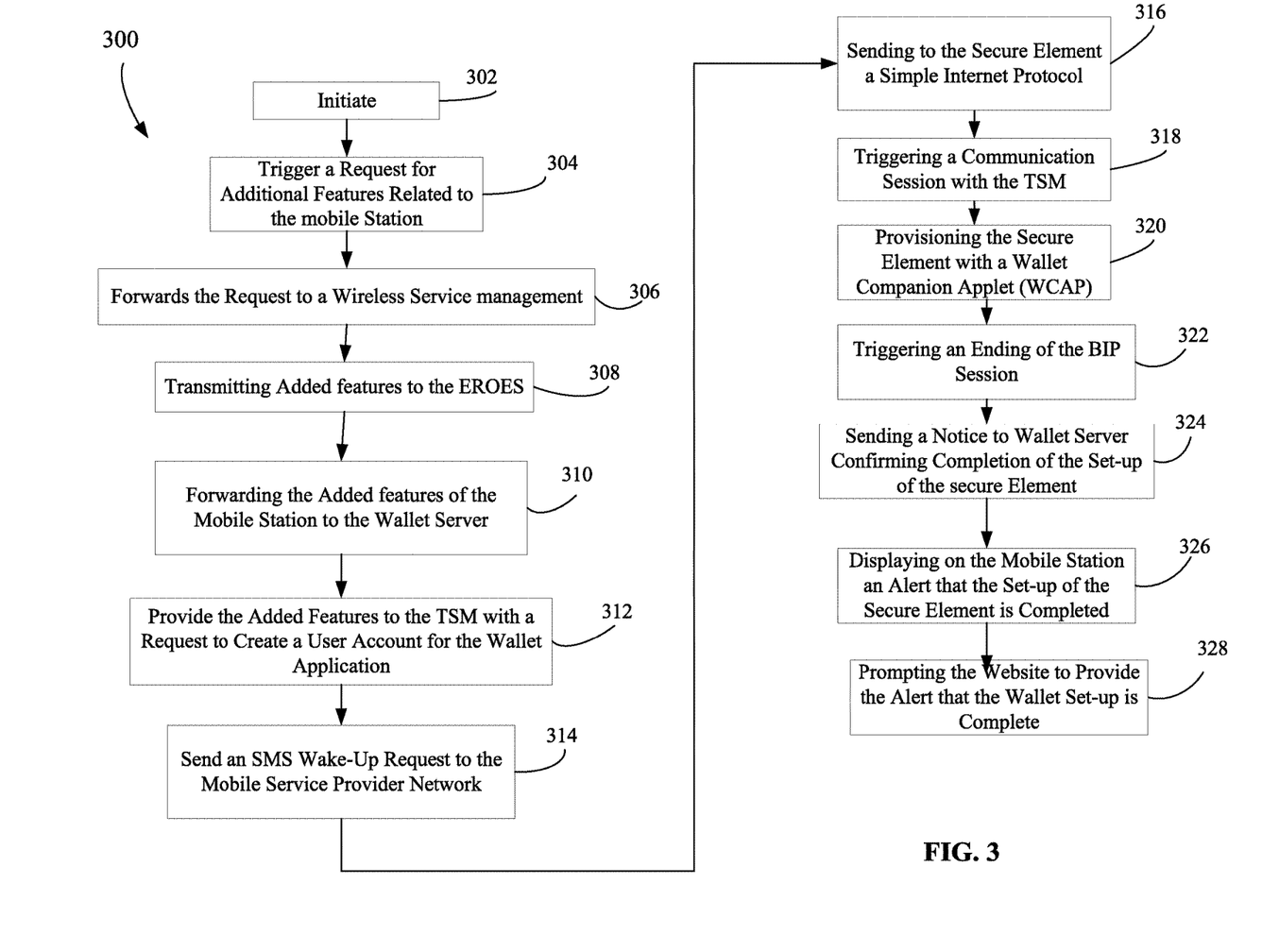
FIG. 3 illustrates an exemplary process for programming the secure element during the activation process.

FIG. 3 illustrates an exemplary process 300 for programming the secure element 35*a* during the activation process. As stated above, in one implementation, the programming process of the secure element 35*a* is initiated once the terms and conditions of the wallet service are accepted by the user. Following the initiation of the programming process at Step 302, the wallet application server 34*a* is configured to trigger a request for additional features related to the mobile station 13 from the IT site 25*a*, at Step 304. The additional features may include, for example, information about spending limits placed on the mobile station by the user, the mobile network operator, or a financial company. For example, a parent giving a mobile station to a child may authorize the child to make purchase for no more than $100 per month. A bank may place restrictions on purchases by a customer who is near the credit limit on his/her credit card. In one implementation, the request may be received by an electronic remote order entry system (EROES) 25*b* which forwards the request to a wireless service management server 25*c* that is configured to retrieve the requested additional features from a station management database 25*d*, at Step 306. The wireless service management server 25*c*, which manages wireless services is configured to manage and keep track of billing and account features and services. Once retrieved, the added features are transmitted to the EROES 25*b*, at Step 308. Subsequently, at Step 310, the EROES 25*b* forwards the additional features of the mobile station 13 to the wallet application server 34*a*.

Upon receipt of the additional features, the wallet application server 34*a* is configured to provide the additional features to the TSM 34*b* with a request to create a user account for the wallet application, at Step 312. To proceed with the creation of the user account for the wallet application, the TSM 34*b* is configured to send an SMS wake-up request to the mobile service provider system 25, at Step 314, as shown in information flow 448 of FIG. 4B. In one implementation, the SMS wake-up request may be provided to mobile service provider system 25 through a long term evolution (LTE) SMS gateway 25e, which is configured as a gateway for exchanging short messages between users. In response, the mobile service provider system 25 is configured to send to the secure element 35a a simple internet protocol (SIP), which can be used to initiate a communication session with the TSM 34b, at Step 316. Upon receipt of the SIP, the secure element 35a triggers a communication session with the TSM 34b, at Step 318. In one implementation, the triggered communication session may be a bearer internet protocol (BIP) session. Based on the information stored in the secure element 35a, the TSM 34b is configured to provision the secure element 35a with a wallet companion applet (WCAP) and a proximity payment system environment (PPSE), at Step 320.

As known to one of ordinary skill in the art, the loading of the WCAP on the secure element 35a includes loading interfaces of the WCAP onto the secure element 35a. Moreover, in one implementation, the WCAP is activated by TSM 34b to store information, such as data about the mobile station 13, such as type and number data. In addition, the WCAP may be configured to serve as a secure storage of data, such as mobile wallet data, which is used by the wallet application 35 to process financial transactions.

Once the secure element 35a is provisioned, TSM 34b is configured to trigger an ending of the BIP session, at Step 322. Subsequently, TSM 34b is configured to send a notice informing the wallet application server 34a that the wallet setup is completed, at Step 324. The notice may include a textual confirmation or a predetermined numeric confirmation. The notice may be transmitted using any protocol, such as SMS or IP. Upon receipt of the notice, the wallet application server 34a is configured to prompt the wallet application 35 to display an alert on the mobile station 13 that the wallet set-up is complete, at Step 326. The alert may be a textual alert and may include, for example, the words "setup complete." In some examples, the alert is a textual alert and includes the same text as the notice informing the wallet application server 34a that the wallet setup is complete. Moreover, the wallet application server 34a is also configured to prompt the website 31a accessed by the user to also provide the alert that the wallet set-up is complete, at Step 328. In one implementation, the alert displayed on the mobile station 13 may be similar to the alert provided through a user interface of the website 31a. Alternatively, these two alerts may confirm that the wallet set-up is completed using a different information display.

Figure 4A:
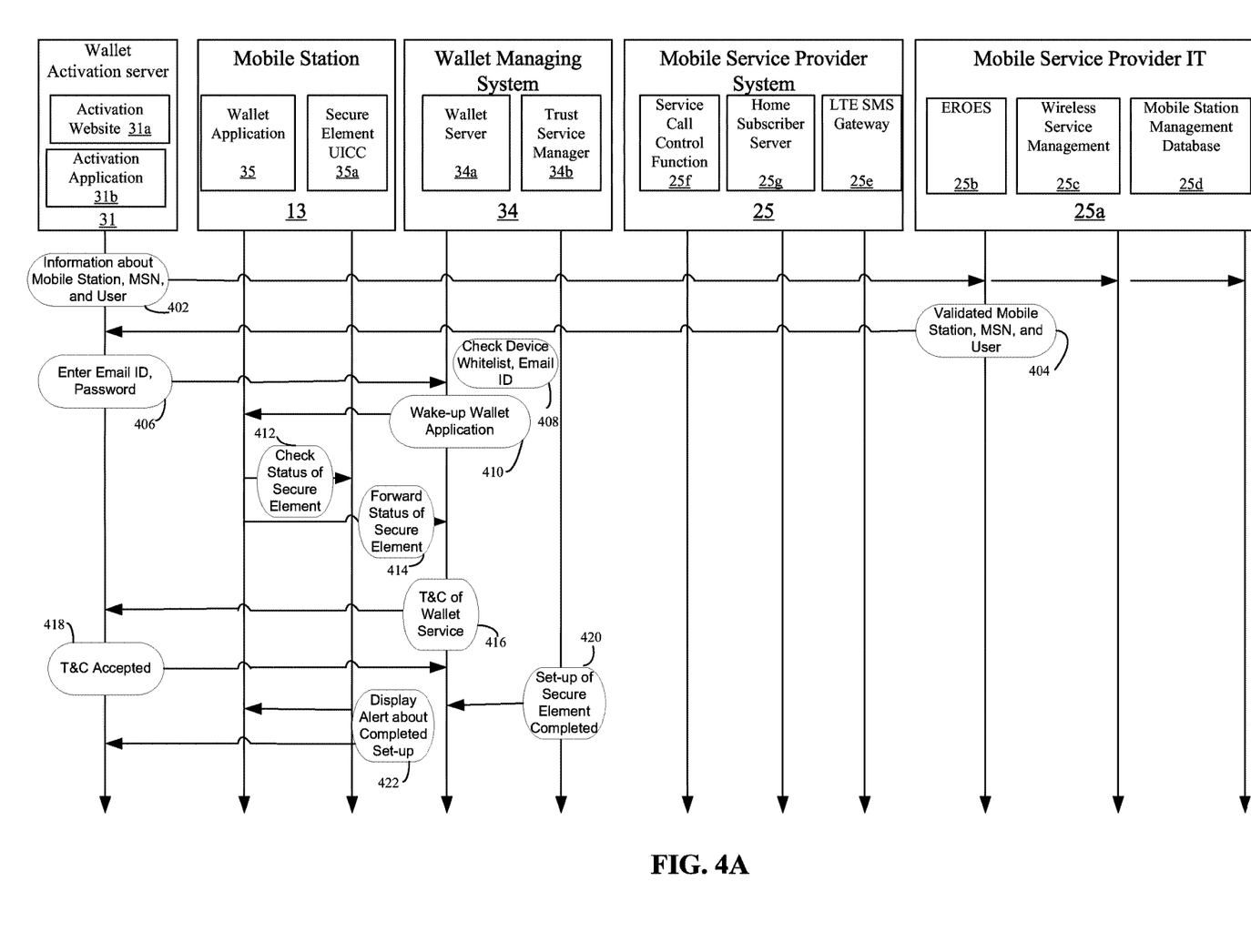
FIGS. 4A-4B are block diagrams illustrating information flows between components of an activation supporting server, a mobile station, a wallet managing network, a mobile service provider network, and information technology of a mobile service provider.

FIG. 4A is a block diagram illustrating information flows between components of an activation supporting server, a mobile station, a wallet managing network, a mobile service provider network, and information technology of a mobile service provider. The computing machines and networks involved in FIG. 4A include the wallet activation server 31, the mobile station 13, the wallet managing system 34, the mobile service provider system 25, and the mobile service provider information technology (IT) 25a. The wallet activation server includes an activation website 31a and an activation application 31b, the operation of which is described above. The mobile station 13 includes a wallet application 35 and a secure element UICC 35a. The wallet managing system 34 includes a wallet server 34a and a trust management server 34b. The mobile service provider system 25 includes a service call control function 25f, a home subscriber server 25g, and a LTE SMS gateway 25e. The mobile service provider IT includes EROES 25b, a wireless service management 25c, and a mobile station management database 25d.

In information flow 402, information about the mobile station, the MSN, and the user are transmitted from the wallet activation server 31 to the EROES 25b, the wireless service management 25c, and the mobile station management database 25d. In information flow 404, the mobile station 13, the MSN, and the user are validated at the EROES 25b, and a confirmation (e.g., text or predetermined message) of the validation is sent back to the wallet activation server 31. In information flow 406, the user provides his/her email ID and password to the wallet activation server 31, and this information is forwarded to the wallet server 34a in information flow 408. The email ID and password may be associated with the information about the mobile station 13 so that the user can identify his/her mobile station using his/her email ID and password when accessing the financial information stored in the mobile station 13 remotely from a computer different from the mobile station 13. In information flow 410, the wake up wallet application executes at the wallet server 34a and the wallet application 35a of the mobile station 13. In information flow 412, the mobile station 13, using the wallet application 35, checks the status of the secure element UICC 35a. In information flow 414, the status of the secure element UICC 35a is forwarded, using the wallet application 35, to the wallet server 34a. In information flow 416, terms and conditions of the wallet server are provided to a client device through the wallet activation server 31 and the wallet server 34a. In information flow 418, the terms and conditions are accepted, and the acceptance is forwarded to the wallet activation server 31 and the wallet server 34a. In information flow 420, the setup of the secure element is completed, and the wallet server 34a is notified of this. In information flow 422, an alert (e.g., a text alert) that the setup of the secure element is completed is displayed at the mobile station 13 and a client device connected to the wallet activation server.

Figure 4B:
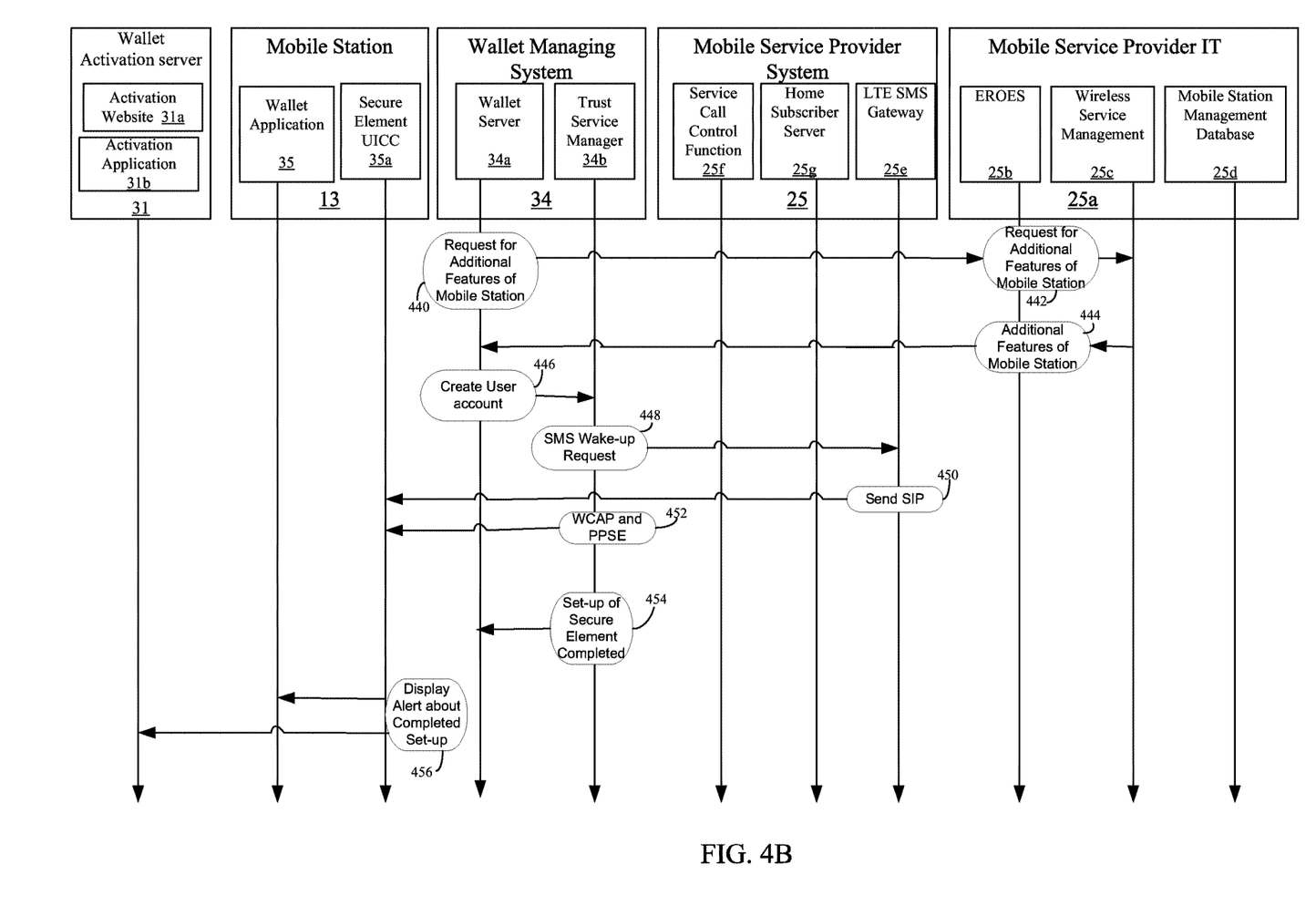

FIG. 4B is a block diagram illustrating information flows between components of an activation supporting server, a mobile station, a wallet managing network, a mobile service provider network, and information technology of a mobile service provider. The computing machines and networks involved in FIG. 4B include the wallet activation server 31, the mobile station 13, the wallet managing system 34, the mobile service provider system 25, and the mobile service provider information technology (IT) 25a. The wallet activation server 31 includes an activation website 31a and an activation application 31b, the operation of which is described above. The mobile station 13 includes a wallet application 35 and a secure element UICC 35a. The wallet managing system 34 includes a wallet server 34a and a trust management server 34b. The mobile service provider system 25 includes a service call control function 25f, a home subscriber server 25g, and a LTE SMS gateway 25e. The mobile service provider IT includes EROES 25b, a wireless service management 25c, and a mobile station management database 25d.

In information flows 440 and 442, the wallet server 34a (information flow 440) request additional features of the mobile station 13 from EREOS 25b, which forwards the requested additional features to the wireless service management 25c. Alternatively, the wallet server 34a (information flow 440) may request additional features of the mobile station 13 directly from the wireless service management 25c. In information flow 444, the additional features of the mobile station 13 are provided from the wireless service management 25c to the wallet server 34a and EROES 25b. In information flow 446, a user account for the wallet application is created at the wallet server 34a and the trust service manager 34b. In information flow 448, an SMS wake up request (or a wake up request in another protocol) is sent from the trust service manager 34b to the LTE SMS gateway 25e. In information flow 450, the LTE SMS gateway 25e sends a session initiation protocol (SIP) message to the secure element UICC 35a. In information flow 452, the trust service manager 34b sends a WCAP and/or proximity payment system environment (PPSE) message to the secure element UICC 35a. In information flow 454, the trust service manager 34b notifies the wallet server 34a that the setup of the secure element is completed. In information flow 456, an alert (e.g., a textual alert) that the setup of the secure element is completed is displayed at the mobile station 13 (via the wallet application 35) and a client device connected to the wallet activation server 31.

Once a digital wallet is established on the secure element 35a with payment credentials and payment cards, a user can use his/her mobile station 13 for online payments with a merchant that can support the online payments.

In one implementation, a website of a web server of the merchant includes a wallet payment application that provides a wallet interface to an accessing user in order to authenticate and authorize an online payment with the digital wallet of the mobile station 13.

Once the user accesses the merchant website and after selecting items to purchase, the user selects via the wallet interface to pay with the digital wallet, and enter his/her username, the mobile station number, a password, and a PIN. Alternatively, the website may already have the user entered information saved for a seamless check-out. Subsequently, the wallet payment application initiates a payment request to the wallet application server 34a.

In response, the wallet application server 34a initiates a wake-up of the wallet application 35 by presenting the user a visual output display that includes an icon to trigger the wallet application 35 and that indicates that an online payment transaction is being requested. The payment transaction may be tagged with a unique identifier throughout the transaction process, such as the user ID, the merchant ID, date and time, and a payment amount, which can be encrypted or randomized for security purposes.

Upon receipt of the visual output display, the user activates the displayed icon to trigger the wallet application 35. Alternatively, the user may trigger the wallet application 35 directly via the mobile station 13 and enter a PIN if required. Once triggered, the wallet application 35 is configured to retrieve information about payment cards from the secure element 35a.

After retrieving the information about the payment cards, the wallet application 35 displays for the user information about the requested online payment and prompts him/her to select one of the payment cards. The online payment information may be presented as a charge request that includes the merchant name, item(s) selected for purchase, and the required total payment.

After a payment card is selected, the wallet application 35 sends an authorization and payment card information about the selected payment card to the wallet application server 34a. The wallet application server 34a then communicates back to the merchant webserver with an authorization to complete the online payment transaction.

If the online payment transaction fails due to a decline of the selected payment card, the merchant web server informs the wallet application server 34a. In turn, the wallet application server 34a informs the user via the wallet application 35 that the payment transaction failed, and suggests to the user to select an alternate payment card. Alternatively, the webserver informs the user about the failed payment transaction through a statement displayed on the wallet interface.

In the event of a successful payment transaction, the merchant web server informs the wallet application server 34a. In turn, the wallet application server 34a informs the user via the wallet application 35 that the payment was successful. Alternatively, the webserver informs the user about the successful payment through a statement displayed on the wallet interface.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 5A:
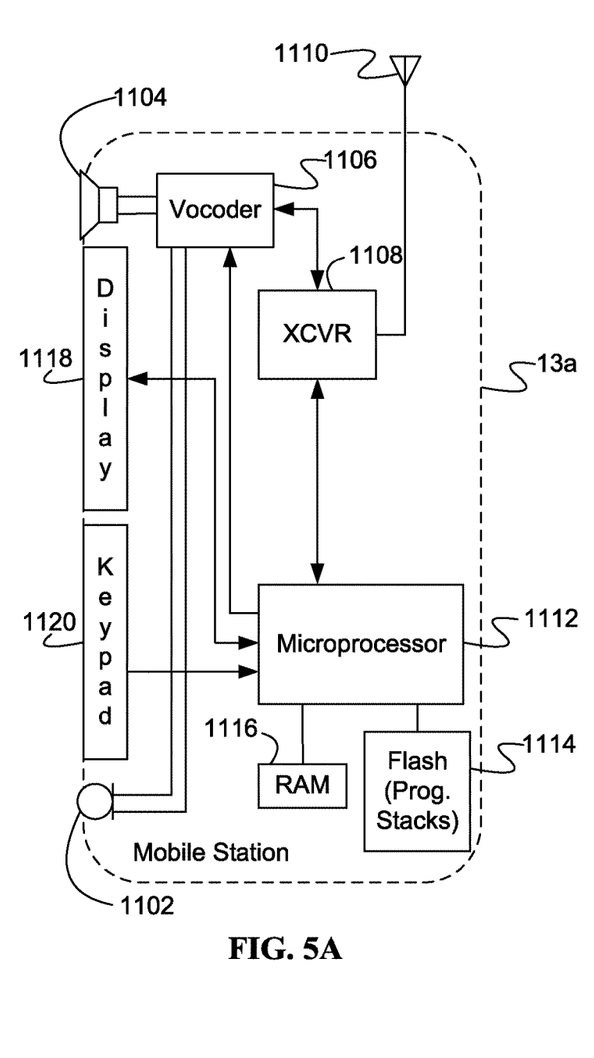
FIG. 5A is a high-level functional block diagram of an exemplary non-touch type mobile station used to activate a secure element.

As stated above, the wallet application 35 of the mobile station 13 may be downloaded from a mobile service carrier to the computing station. FIG. 5A provides a block diagram illustration of an exemplary non-touch type mobile station 13a. Although the mobile station 13a may be a smart-phone or may be incorporated into another station, such as a personal digital assistant (PDA) or the like, for discussion purposes, the illustration shows the mobile station 13a is in the form of a handset. The handset example of the mobile station 13a functions as a normal digital wireless telephone station. For that function, the station 13a includes a microphone 1102 for audio signal input and a speaker 1104 for audio signal output. The microphone 1102 and speaker 1104 connect to voice coding and decoding circuitry (vocoder) 1106. For a voice telephone call, for example, the vocoder 1106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13a also includes at least one digital transceiver (XCVR) 1108. Today, the handset 13a is configured for digital wireless communications using one or more of the common network technology types. The concepts discussed here encompass examples of the mobile station 13a utilizing any digital transceivers that conform to current or future developed digital wireless communication standards. The mobile station 13a may also be capable of analog operation via a legacy network technology.

The transceiver 1108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13a and the communication network. Each transceiver 1108 connects through RF send and receives amplifiers (not separately shown) to an antenna 1110. The transceiver may also support various types of mobile messaging services, such as short message service (SMS), enhanced messaging service (EMS) and/or multimedia messaging service (MMS).

The mobile station 13a includes a display 1118 for displaying messages, menus or the like, call related information dialed by the user, calling party numbers, etc. A keypad 1120 enables dialing digits for voice and/or data calls as well as generating selection inputs, for example, as may be keyed-in by the user based on a displayed menu or as a cursor control and selection of a highlighted item on a displayed screen. The display 1118 and keypad 1120 are the physical elements providing a textual or graphical user interface. Various combinations of the keypad 1120, display 1118, microphone 1102 and speaker 1104 may be used as the physical input output elements of the graphical user interface (GUI), for secure element activation. Of course other user interface elements may be used, such as a trackball, as in some types of PDAs or smart phones.

A microprocessor 1112 serves as a programmable controller for the mobile station 13a, in that it controls all operations of the mobile station 13a in accord with programming that it executes, for all normal operations, and for operations involved in the identification and communication of secure element activation procedure under consideration here. In the example, the mobile station 13a includes flash type program memory 1114, for storage of various "software" or "firmware" program routines and mobile configuration settings, such as mobile directory number (MDN) and/or mobile identification number (MIN), etc. The mobile station 13a may also include a non-volatile random access memory (RAM) 1116 for a working data processing memory. Of course, other storage stations or configurations may be added to or substituted for those in the example. The memories 1114, 1116 also store various software and data, such as the wallet application. Programming stored in the flash type program memory 1114, sometimes referred to as "firmware," is loaded into and executed by the microprocessor 1112.

As outlined above, the mobile station 13a includes a processor, and programming stored in the flash memory 1114 configures the processor so that the mobile station is capable of performing various desired functions, including in this case the functions involved in the technique for activating secure elements.

Figure 5B:
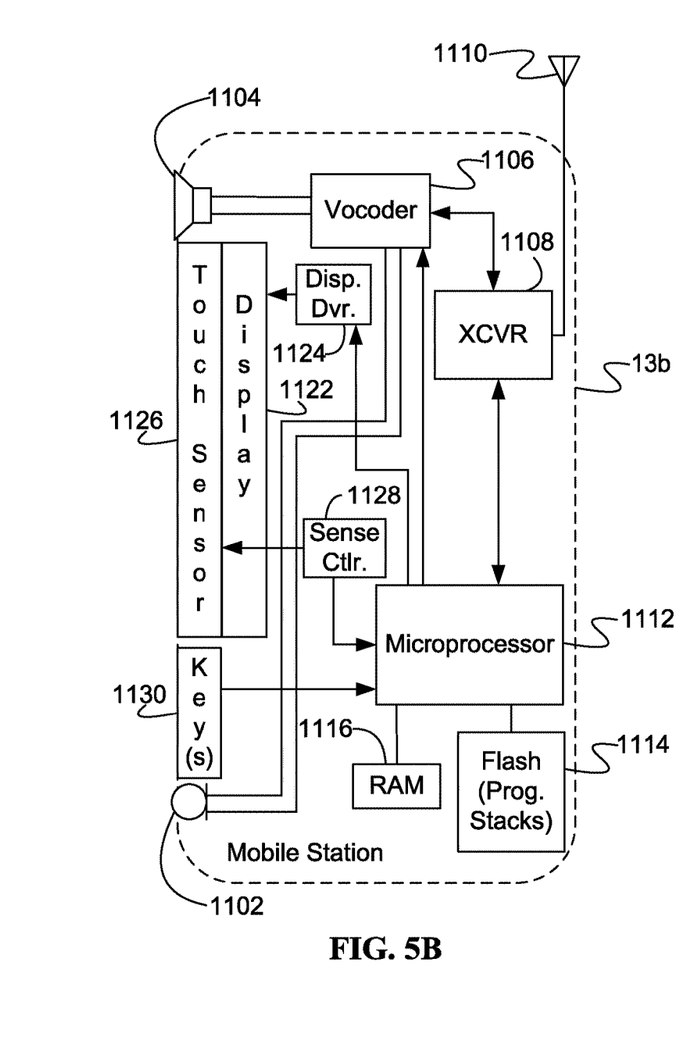
FIG. 5B is a high-level functional block diagram of an exemplary touch screen type mobile station used to activate a secure element.

For purposes of such a discussion, FIG. 5B provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 5A. For example, the touch screen type mobile station 13b includes a microphone 1102, speaker 1104 and vocoder 1106, for audio input and output functions, much like in the earlier example. The mobile station 13b also includes at least one digital transceiver (XCVR) 1108, for digital wireless communications, although the handset 13b may include an additional digital or analog transceiver. The concepts discussed here encompass examples of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13b and the communication network. Each transceiver 1108 connects through RF send and receive amplifiers (not separately shown) to an antenna 1110. The transceiver may also support various types of mobile messaging services, such as short message service (SMS), enhanced messaging service (EMS) and/or multimedia messaging service (MMS).

As in the example of station 13a, a microprocessor 1112 serves as a programmable controller for the mobile station 13b, in that it controls all operations of the mobile station 13b in accord with programming that it executes, for all normal operations, and for operations involved in the secure element activation procedure under consideration here. In the example, the mobile station 13b includes flash type program memory 1114, for storage of various program routines and mobile configuration settings. The mobile station 13b may also include a non-volatile random access memory (RAM) 1116 for a working data processing memory. Of course, other storage stations or configurations may be added to or substituted for those in the example. Hence, outlined above, the mobile station 13b includes a processor, and programming stored in the flash memory 1114 configures the processor so that the mobile station is capable of performing various desired functions, including in this case the functions involved in the technique for activating secure elements.

In the example of FIG. 5A, the user interface elements included a display and a keypad. The mobile station 13b may have a limited number of key 1130, but the user interface functions of the display and keypad are replaced by a touchscreen display arrangement. At a high level, a touchscreen display is a station that displays information to a user and can detect occurrence and location of a touch on the area of the display. The touch may be an actual touch of the display station with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 1122, which the microprocessor 1112 controls via a display driver 1124, to present visible outputs to the station user. The mobile station 13b also includes a touch/position sensor 1126. The sensor 1126 is relatively transparent, so that the user may view the information presented on the display 1122. A sense circuit 1128 sensing signals from elements of the touch/position sensor 1126 and detects occurrence and position of each touch of the screen formed by the display 1122 and sensor 1126. The sense circuit 1128 provides touch position information to the microprocessor 1112, which can correlate that information to the information currently displayed via the display 1122, to determine the nature of user input via the screen.

The display 1122 and touch sensor 1126 (and possibly one or more keys 1130, if included) are the physical elements providing the textual and graphical user interface for the mobile station 13b. The microphone 1102 may be used as an additional user interface element, for audio input, with respect to activation of secure elements. The structure and operation of the mobile stations 13a and 13b, as outlined above, were described to by way of example, only.

Figures 6A, 6B:
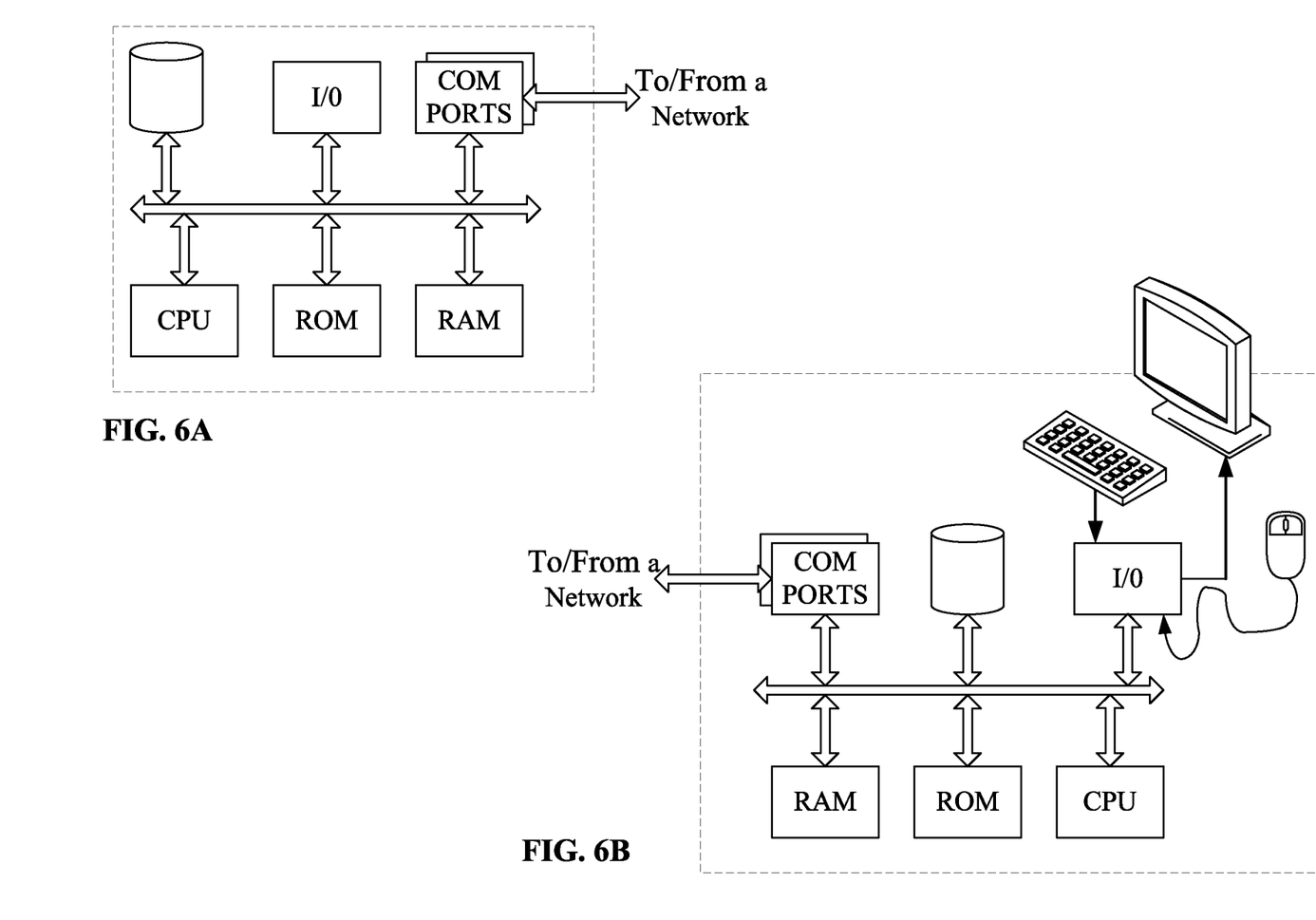
FIG. 6A is a simplified functional block diagram of a computer that may be configured as a host or server, for example, to function as the data provider in the system of FIG. 1.
FIG. 6B is a simplified functional block diagram of a personal computer or other work station or terminal station.

FIGS. 6A and 6B provide functional block diagram illustrations of general purpose computer hardware platforms. FIG. 6A illustrates a network or host computer platform, as may typically be used to implement a server. FIG. 6B depicts a computer with user interface elements, as may be used to implement a personal computer or other type of work station or terminal device, although the computer of FIG. 6B may also act as a server if appropriately programmed. It is believed that the general structure and general operation of such equipment as shown in FIGS. 6A and 6B should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIGS. 6A and 6B). A mobile station type user terminal may include similar elements, but will typically use smaller components that also require less power, to facilitate implementation in a portable form factor. The various types of user terminal devices also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, examples of the techniques for loading or storing the page at the content management server outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the wallet application 35, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a Blu-ray disc read-only memory (BD-ROM), CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Figure 7:
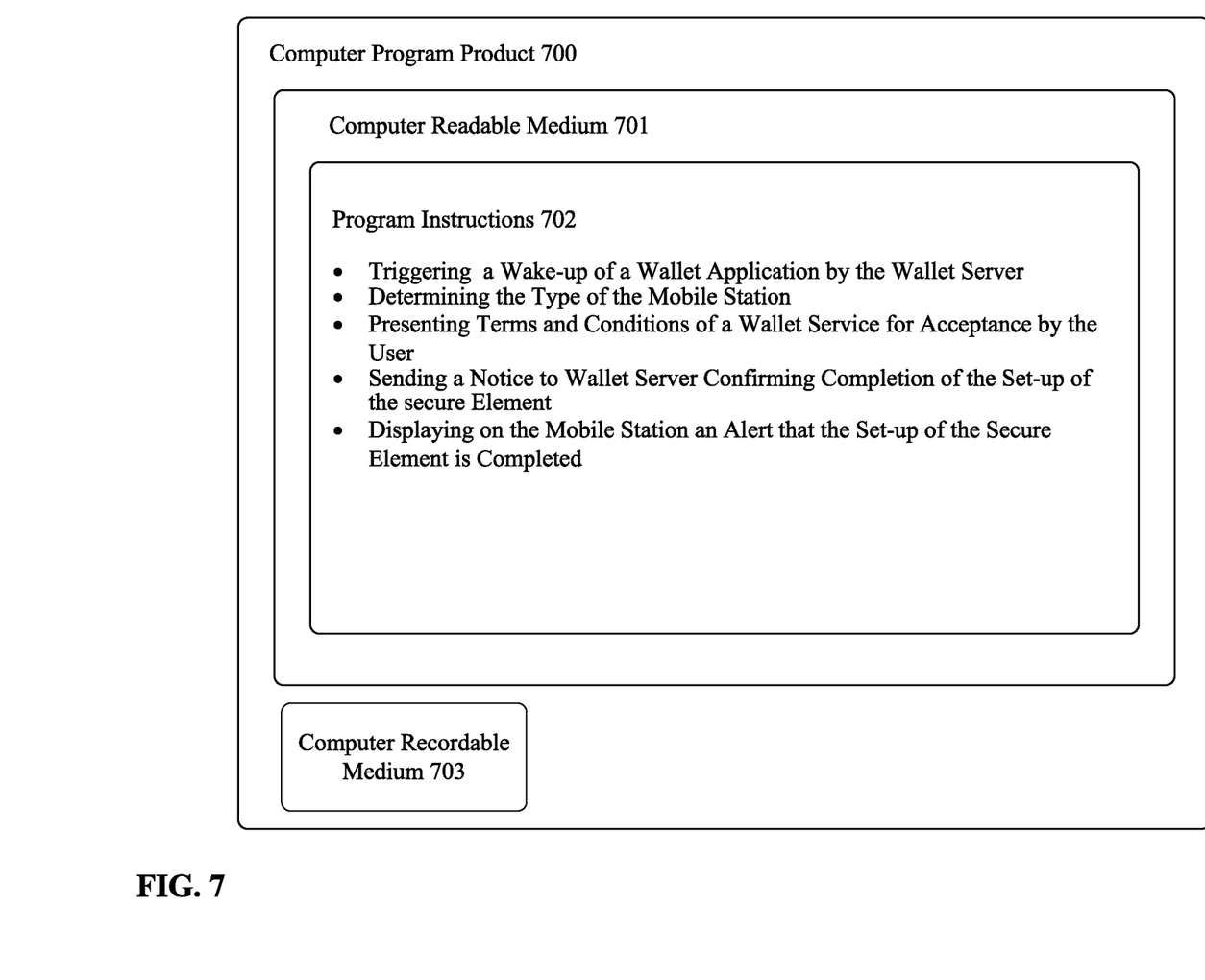
FIG. 7 is a schematic diagram illustrating a conceptual partial view of an example computer program product.

In some examples, the discussed methods may be implemented as computer program instructions encoded on a computer-readable storage media in a machine-readable format. FIG. 7 is a schematic diagram illustrating a conceptual partial view of an example computer program product 700 that includes a computer program for executing a computer process on a computing station, arranged according to at least some examples presented herein. The example computer program product 700 may be provided using a non-transitory computer readable medium 701. The non-transitory computer readable medium 701 may include one or more programming instructions 702 that, when executed by one or more processors may provide functionality or portions of the functionality described above with respect to FIGS. 2, 3, 4A, and 4B. Thus, for example, referring to the example shown in FIGS. 2 and 3, one or more features of blocks 202-230 or one or more features of blocks 302-328, may be undertaken by one or more instructions associated with the non-transitory computer readable medium 701.

In some implementations, the non-transitory computer readable medium 701 may encompass a computer recordable medium 703, such as, but not limited to, memory, read/write (R/W) CDs, R/W DVDs, etc. The one or more programming instructions 702 may be, for example, computer executable and/or logic implemented instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   detecting, via a processor, access by a computing device to an online service configured to manage a wallet activation process of a secure element of a mobile station;
   receiving, from the computing device, information confirming that a user of the computing device has permission to access the mobile station;
   verifying the information confirming that the user of the computing device has permission to access the mobile station;
   triggering instantiation of a wallet application on the mobile station, the wallet application configured to access the secure element;
   triggering the wallet application to initiate activation and programming of the secure element; and
   receiving, via the wallet application, a confirmation that activation and programming of the secure element are complete.

2. The method of claim 1, wherein the received information includes data corresponding to user name, type of the mobile station, and identifier of the mobile station.

3. The method of claim 1, wherein triggering the wallet application to initiate activation and programming of the secure element comprises establishing a personal identification number (PIN) number for the secure element.

4. The method of claim 1, wherein the wallet application is further configured to determine whether the secure element is already configured with a preexisting account that permits the mobile station to engage financial transactions using the secure element.

5. The method of claim 1, further comprising triggering the wallet application to access the secure element to determine a type of the secure element and to provide the type of the secure element to a wallet application server.

6. The method of claim 5, wherein the instantiation of the wallet application is triggered via a short message service (SMS) communication generated by the wallet application server.

7. The method of claim 5, wherein triggering the wallet application to initiate the activation and programming of the secure element comprises: triggering the wallet application server to inform a trusted service manager (TSM) to proceed with the activation and programming of the secure element.

8. The method of claim 7, wherein, after the secure element is activated and programmed, the trusted service manager is configured to provide the activation and programming confirmation to the wallet application and to the wallet application server.

9. The method of claim 5, further comprising: when the type of the secure element has been determined, providing, for acceptance by the user, terms and conditions of a wallet service received from the wallet application server.

10. The method of claim 1, further comprising: after the secure element is activated and programmed, triggering the wallet server to send to the computing device the visual output.

11. A non-transitory computer-readable medium comprising instructions which, when executed by one or more computers, cause the one or more computers to:
    detect access by a computing device to an online service configured to manage a wallet activation process of a secure element of a mobile station;
    receive, from the computing device, information confirming that a user of the computing device has permission to access the mobile station;
    verify the information confirming that the user of the computing device has permission to access the mobile station;
    trigger instantiation of a wallet application on the mobile station, the wallet application configured to access the secure element;
    trigger the wallet application to initiate activation and programming of the secure element; and
    receive, via the wallet application, a confirmation that activation and programming of the secure element are complete.

12. The non-transitory computer-readable medium of claim 11, wherein the received information includes data corresponding to user name, type of the mobile station, and identifier of the mobile station.

13. The non-transitory computer-readable medium of claim 11, wherein the instruction to trigger the wallet application to initiate activation and programming of the secure element comprises an instruction to establish a PIN number for the secure element.

14. The non-transitory computer-readable medium of claim 11, wherein the instructions further cause the wallet application to be configured to access the secure element to determine a type of the secure element and provide the type of the secure element to a wallet application server.

15. The non-transitory computer-readable medium of claim 14, wherein the instruction to trigger instantiation of the wallet application comprises causing the wallet application server to generate a short message service (SMS) communication.

16. The non-transitory computer-readable medium of claim 14, wherein the instruction to trigger the wallet application to initiate activation and programming of the secure element comprises an instruction to trigger the wallet server to inform a trusted service manager (TSM) to proceed with the programming of the secure element.

17. The non-transitory computer-readable medium of claim 16, wherein once the secure element is activated and programmed, the trusted service manager is configured to provide the activation and programming confirmation to the wallet application and to the wallet application server.

18. The non-transitory computer-readable medium of claim 14, further comprising instructions to: upon determination of the type of the secure element, provide for acceptance by the user terms and conditions of a wallet service received from the wallet application server.

19. The non-transitory computer-readable medium of claim 11, wherein the wallet application is further configured to determine whether the secure element is already configured with a preexisting account.

20. A system comprising:
a processor, and
a memory comprising instructions which, when executed by the processor, cause the processor to:
   detect access by a computing device to an online service configured to manage a wallet activation process of a secure element of a mobile station;
   receive, from the computing device, information confirming that a user of the computing device has permission to access the mobile station;
   verify the information confirming that the user of the computing device has permission to access the mobile station;
   trigger instantiation of a wallet application on the mobile station, the wallet application configured to access the secure element;
   trigger the wallet application to initiate activation and programming of the secure element; and
   receive, via the wallet application, a confirmation that activation and programming of the secure element are complete.

21. The method of claim 2, wherein verifying the information comprises comparing the received information with information stored in a station management database associated with a mobile network server.

* * * * *